W. P. EWING.
Horse Rake.
No. 95,010.  Patented Sept. 21, 1869.
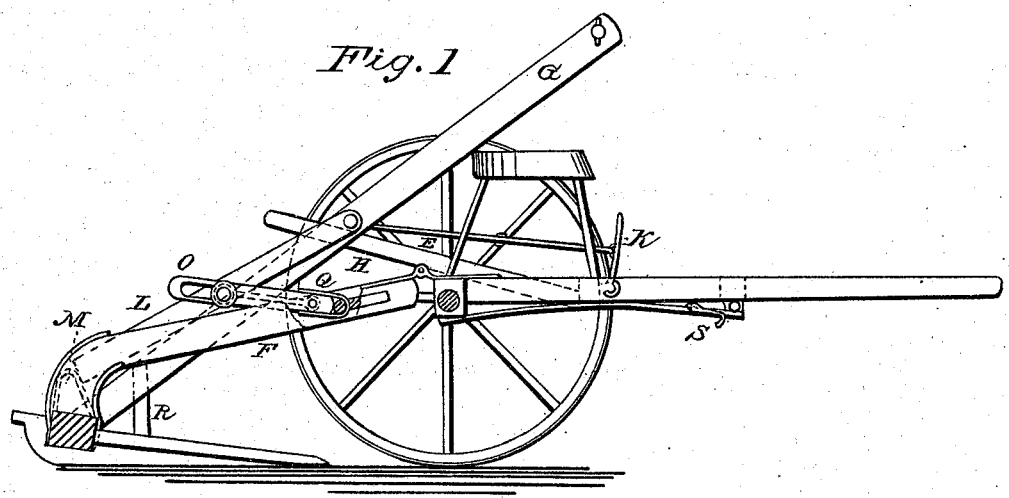
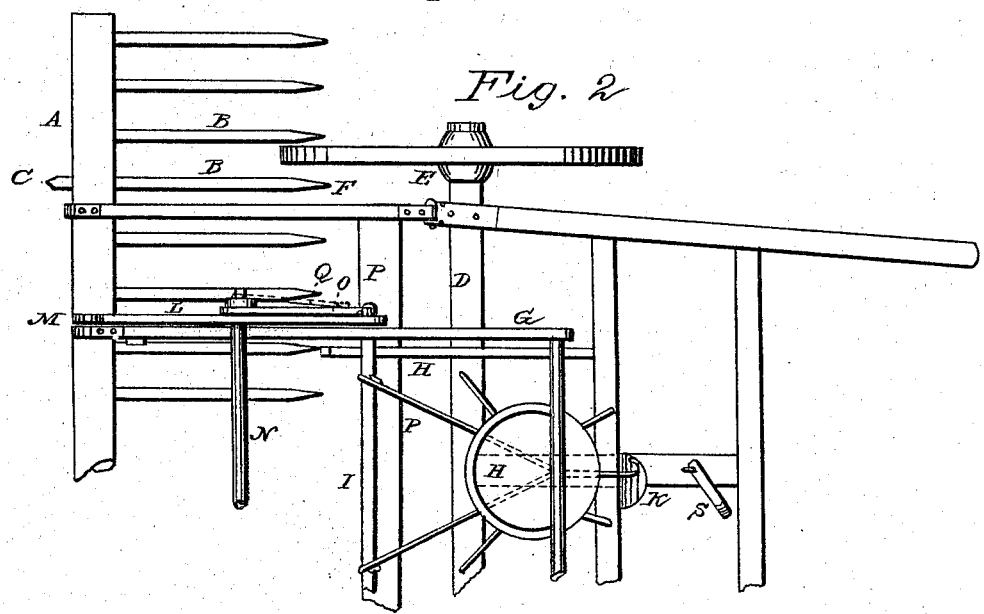
Witnesses
Inventor

United States Patent Office.

WILLIAM P. EWING, OF FANCY HILL, VIRGINIA.

Letters Patent No. 95,010, dated September 21, 1869.

HORSE HAY-RAKE.

The Schedule referred to in these Letters Patent and making part of the same.

*To all whom it may concern:*

Be it known that I, WILLIAM P. EWING, of Fancy Hill, in the county of Rockbridge, and State of Virginia, have invented a new and improved Horse Hay-Rake; and I do hereby declare that the following is a full, clear, and exact description thereof, which will enable others skilled in the art to make and use the same, reference being had to the accompanying drawing, forming part of this specification.

This invention relates to improvements in horse hay-rakes, designed to provide a simple and efficient machine for attachment to a sulky, whereon the operator may ride while drawing and attending to the rake.

It consists in a rake, having one set of teeth, detachably connected to the sulky, and provided with operating and governing-apparatus, arranged as hereinafter fully specified.

Figure 1 represents a longitudinal sectional elevation, and

Figure 2 represents a partial plan view.

Similar letters of reference indicate corresponding parts.

A represents a rake-head, having one set of ordinary wood teeth, B, and two or more short studs, C, on the opposite side, to facilitate turning.

The said rake-head is detachably connected to the truck-axle D by hinged joints E, at the ends of the draw-bars F, in the ends of which the rake-head is capable of turning.

G represents the handles, also connected to the rake-head, so as to permit the latter to turn, and rising up in advance of the seat H, conveniently for the operators when sitting thereon.

These handles are connected by a rod, I, resting on arms projecting rearward, at a slight inclination from the truck, serving as a fulcrum for the said arms.

The rod I is connected by rods to a foot-treadle, K, in front of the seat.

L represents stop-bars, also jointed to the rod I, and resting at their lower ends against the stops M on the rake-head, to prevent the latter from revolving while gathering the hay.

These stop-rods are connected to a rod, N, passing over and resting on the handles G, also passing through slotted bars O, hinged to the transverse bar P, connected at each end to the draw-bars F.

The ends of the rod N are connected, by spiral or other springs Q, to the inner ends of the slotted bars, in a manner to constantly draw the said rod in that direction. This rod N serves as the fulcrum of the stop-bars L.

R represents spring-stops, projecting from the handles, to hold the fingers down.

When the rake has gathered a sufficient amount of hay to be discharged, the operator draws the handles forward and downward, either by the hands or feet, the latter acting on the treadle, which will, through the stops R, depress the points of the teeth so as to catch into the ground, and swing the lower ends of the stop-bars L above the tops of the stops M, allowing the rake-head to turn over and deliver the hay. As the short studs C, by this operation, are brought into contact with the ground, they will cause a full revolution to the teeth.

Previously to the full movement of the teeth, the operator allows the handles to resume their normal position, and the springs Q are thus permitted to draw the stop-bars L down upon the stops, to secure the teeth until they gather another load.

The front ends of the teeth may be elevated, to pass over stones or other elevations, by raising the handles, so as to force the stop-bars back against the stops M.

The teeth may also be pressed upon the ground with great force, when required, as in raking when the hay is very thick, by pressing on the treadle by the feet, and raising the ends of the handles.

For moving the machine along the road, or when it is not required to work, the handles may be brought down at the front, and secured by the hooks S, which will maintain the rake sufficiently above the ground for transportation.

By reason of the detachable connection to the truck, the raking-apparatus may be readily detached when the raking season is over, and the truck employed for other uses.

Having thus described my invention,

What I claim as new, and desire to secure by Letters Patent, is—

1. The handles G, rod I, supports H, stop-bars L, rod N, springs Q and stops M, and rake-head, all combined and arranged substantially as specified.

2. The combination, with the handles, of the treadle K, when all are arranged as specified.

3. The combination, with the arms, of the supports H and hook S, substantially as specified.

4. The arrangement of the arms G, supports H, treadle, spring-stops R, and rake-head, substantially as specified.

W. P. EWING.

Witnesses:
WM. B. MOFFETT,
JOHN A. PRAGUE.